United States Patent
Miyoshi et al.

(10) Patent No.: US 10,688,734 B2
(45) Date of Patent: Jun. 23, 2020

(54) DISCONTINUOUS FIBER-REINFORCED COMPOSITE MATERIAL

(71) Applicant: Toray Industries, Inc., Tokyo (JP)

(72) Inventors: Katsuhiro Miyoshi, Nagoya (JP); Takafumi Hashimoto, Nagoya (JP); Tetsuya Motohashi, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 16/079,606

(22) PCT Filed: Feb. 15, 2017

(86) PCT No.: PCT/JP2017/005410
§ 371 (c)(1),
(2) Date: Aug. 24, 2018

(87) PCT Pub. No.: WO2017/145884
PCT Pub. Date: Aug. 31, 2017

(65) Prior Publication Data
US 2019/0054707 A1    Feb. 21, 2019

(30) Foreign Application Priority Data
Feb. 25, 2016 (JP) .................... 2016-034342

(51) Int. Cl.
*B29C 70/14* (2006.01)
*B29B 15/08* (2006.01)
*B29C 70/12* (2006.01)

(52) U.S. Cl.
CPC .............. *B29C 70/14* (2013.01); *B29B 15/08* (2013.01); *B29C 70/12* (2013.01); *Y10T 428/24132* (2015.01)

(58) Field of Classification Search
CPC ....................... Y10T 428/24132; B29C 70/14
See application file for complete search history.

(56) References Cited

U.S. PATENT DOCUMENTS 8,329,280 B2 * 12/2012 Taketa .................... B29C 70/14
428/105

FOREIGN PATENT DOCUMENTS

| JP | 2006-501085 A | 1/2006 |
| JP | 2009-062474 A | 3/2009 |

(Continued)

*Primary Examiner* — Alexander S Thomas
(74) *Attorney, Agent, or Firm* — DLA Piper LLP (US)

(57) ABSTRACT

A fiber-reinforced material includes a discontinuous reinforcing fiber aggregate of a discontinuous reinforcing fiber having a number average fiber length of 3 to 100 mm and a matrix resin, the discontinuous reinforcing fiber aggregate including a plurality of discontinuous reinforcing fiber bundles having a predetermined number of unidirectionally-bundled single yarns of the discontinuous reinforcing fiber, wherein the discontinuous reinforcing fiber bundle has a cut surface inclined at a predetermined angle with respect to an orientation direction of the single yarn of the discontinuous reinforcing fiber bundle and has different fiber bundle lengths defined as a distance between both ends along the orientation direction of the single yarn of the discontinuous reinforcing fiber bundle, the shorter the fiber bundle length of the discontinuous reinforcing fiber bundle, the smaller a tip angle defined as an acute angle at an end of a two-dimensional plane projection of the discontinuous reinforcing fiber bundle.

8 Claims, 2 Drawing Sheets

I-type

(56) References Cited

FOREIGN PATENT DOCUMENTS

| JP | 2009-062648 A | 3/2009 |
| JP | 2009-274412 A | 11/2009 |
| WO | 2008/149615 A1 | 12/2008 |
| WO | 2013/115337 A1 | 8/2013 |

* cited by examiner

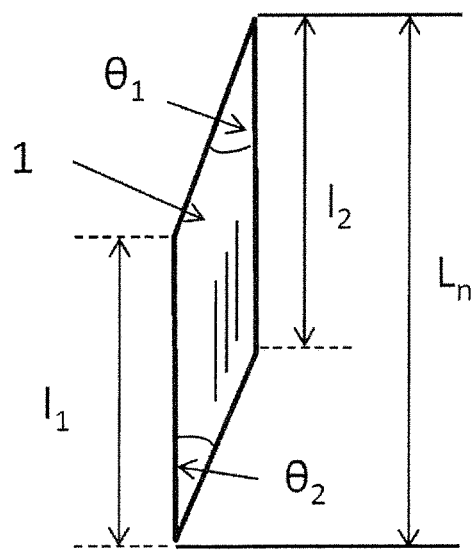
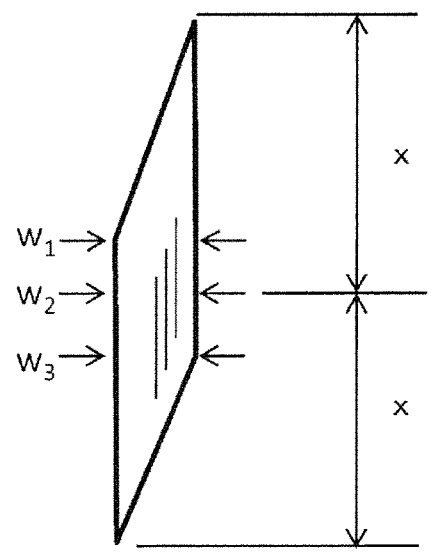
FIG. 1 (A) I-type
FIG. 1 (B)
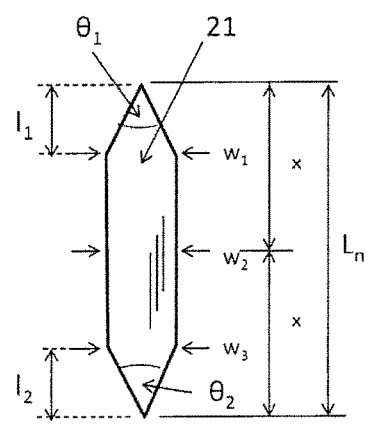
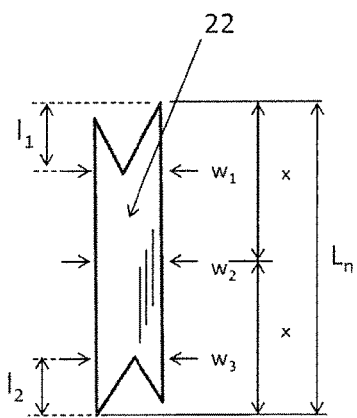
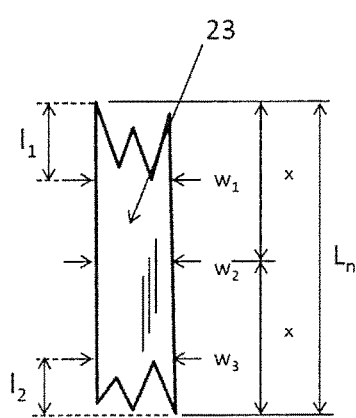
FIG. 2 (A) A-type
FIG. 2 (B) V-type
FIG. 2 (C) W-type FIG. 3
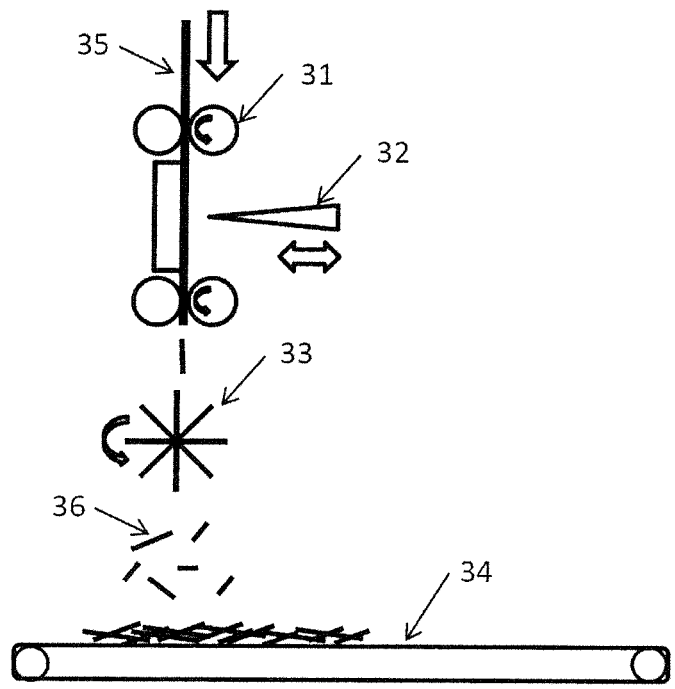
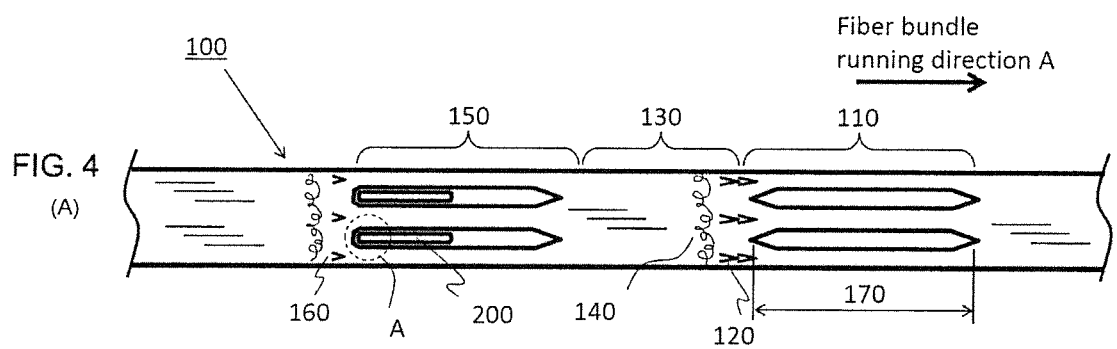
FIG. 4 (A)
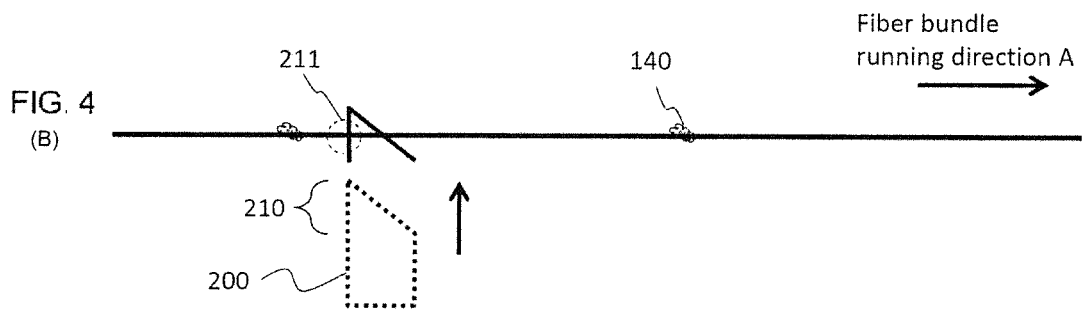
FIG. 4 (B)

DISCONTINUOUS FIBER-REINFORCED COMPOSITE MATERIAL

TECHNICAL FIELD

This disclosure relates to a fiber-reinforced composite material containing at least a discontinuous reinforcing fiber and a matrix resin, and specifically relates to a discontinuous fiber-reinforced composite material excellent in uniformity and mechanical characteristics because the discontinuous reinforcing fiber has a specific fiber bundle form and different fiber bundle lengths and can achieve high fluidity and mechanical characteristics at the same time for producing shaped products.

BACKGROUND

A fiber-reinforced composite material comprising matrix resin and reinforcing fibers has been increasingly used to produce various shaped products in various fields year by year because of its high mechanical properties.

A composite material comprising carbon fibers specifically having excellent performance among reinforcing fibers can generally be formed by an autoclave molding method in which semi-hardened intermediate base materials called "prepreg" made by impregnating continuous carbon fibers with matrix resin are laminated to be heated and pressurized with high-temperature and high-pressure pot to harden the matrix resin of a continuous fiber-reinforced composite material. Recently, for the purpose of improvement of the production efficiency, RTM (Resin Transfer Molding) method in which continuous fiber base material preformed in a shape of member in advance is impregnated with matrix resin to be cured has been employed. The carbon fiber composite materials provided by those molding methods have excellent mechanical properties derived from continuous fibers. The continuous fiber having a regular layout and a small variation of mechanical properties can be designed to have necessary mechanical properties by placement of the base material. However, a complicated shape having a three-dimensional shape or the like cannot easily be formed with continuous fibers while a member in a flat shape can easily be formed.

Complicated shapes such as three-dimensional shapes can be formed with an SMC (Sheet Molding Compound) or a stampable sheet. SMC shaped product may be prepared by heating and pressurizing a semi-hardened sheet-like base material (SMC) by using a heating type pressing machine, wherein the sheet-like base material is made by impregnating the chopped strands made by cutting carbon fiber strands into 25 mm of fiber length with thermosetting matrix resin. The stampable sheet shaped product may be prepared by cooling and pressurizing a sheet-like base material (stampable sheet) in a mold at a predetermined temperature after heating the sheet-like base material by using an infrared heater or the like above the melting point of the thermoplastic resin, wherein the sheet-like base material is made by impregnating chopped strands cut into about 25 mm or a nonwoven fabric mat or the like with thermoplastic resin.

In many cases, SMC and stampable sheet cut into a size smaller than that of the product shape before pressurization are placed on a mold and drawn out (as being flowed) in the form of shaped product by pressurization to perform molding. Therefore it is able to follow a complicated shape such as three-dimensional shapes by the flow. However, the nonwoven fabric mat or chopped strand might have uneven distribution and uneven orientation in the process of making a sheet of SMC or stampable sheet to decrease or vary the mechanical property. The uneven distribution and uneven orientation might cause a sink mark, warping or the like, specifically for a thin member.

To reduce the defects of the material described above, for example, WO 08/149615 discloses chopped fiber bundle and its molding material having a section in which the number of reinforcing fibers increases in the orientation direction of the reinforcing fibers toward the center of the chopped fiber bundle from starting points at both ends of the reinforcing fibers in the orientation direction, although sufficient study has not been accomplished about arbitrarily changing the cutting angle according to length of reinforcing fiber bundle.

Documents

Patent Documents

Patent document 1: WO 08/149615

Accordingly, it could be helpful to provide a fiber-reinforced composite material that can achieve both high fluidity and high mechanical characteristics during molding at a level higher than that could be achieved with a conventional fiber-reinforced composite material comprising reinforcing fiber and matrix resin so that excellent uniformity of fiber-reinforced composite material, excellent flow-molding fluidity and excellent mechanical characteristics are achieved.

SUMMARY

We thus provide:

[1] A discontinuous fiber-reinforced composite material comprising a discontinuous reinforcing fiber aggregate of a discontinuous reinforcing fiber having a number average fiber length of 3 to 100 mm and a matrix resin, the discontinuous reinforcing fiber aggregate including a plurality of discontinuous reinforcing fiber bundles having a predetermined number of unidirectionally-bundled single yarns of the discontinuous reinforcing fiber, wherein the discontinuous reinforcing fiber bundle has a cut surface inclined at a predetermined angle with respect to an orientation direction of the single yarn of the discontinuous reinforcing fiber bundle and has different fiber bundle lengths defined as a distance between both ends along the orientation direction of the single yarn of the discontinuous reinforcing fiber bundle, characterized in that the shorter the fiber bundle length of the discontinuous reinforcing fiber bundle is, the smaller a tip angle defined as an acute angle at an end of a two-dimensional plane projection of the discontinuous reinforcing fiber bundle is.

[2] The discontinuous fiber-reinforced composite material according to [1], wherein a number average acute angle (A) and a number average acute angle (B) satisfy formulae (1) and (2), wherein the number average acute angle (A) is defined as a number average of the tip angle of each discontinuous reinforcing fiber bundle included in the reinforcing fiber bundle (1) comprising a discontinuous reinforcing fiber bundle having a discontinuous fiber bundle length of more than a number average discontinuous fiber bundle length (L) of a number fiber bundle length of the discontinuous reinforcing fiber bundle included in the discontinuous fiber bundle aggregation and wherein the number average acute angle (B) is defined as a number average of the tip angle of each discontinuous reinforcing fiber bundle included in the reinforcing fiber bundle (2) comprising a discontinuous reinforcing fiber bundle having a discontinuous fiber bundle length of a number average discontinuous fiber bundle length (L) or less.

Number average acute angle $(A) \geq$ Number average acute angle $(B) \times 1.3$    Formula (1):

Number average acute angle $(B) < 60°$    Formula (2):

[3] The discontinuous fiber-reinforced composite material according to [1] or [2], wherein the number average fiber bundle length (L) is 3 mm or more and less than 100 mm.
[4] The discontinuous fiber-reinforced composite material according to any one of [1] to [3], wherein the reinforcing fiber bundle (2) has a number average acute angle (B) of 5° to 45°.
[5] The discontinuous fiber-reinforced composite material according to any one of [1] to [4], wherein the reinforcing fiber bundle (2) has a number average fiber bundle length ($L_2$) of 3 mm or more and less than 30 mm.

We provide a discontinuous fiber-reinforced composite material capable of achieving excellent fluidity during molding and high mechanical characteristics of shaped product at the same time, specifically excellent in small variation of mechanical characteristics and formativeness even for complicated shapes.

BRIEF DESCRIPTION OF THE DRAWINGS

FIGS. 1(A) and 1(B) show an example of two-dimensional plane projection view of our discontinuous reinforcing fiber bundle, where (A) shows a position for measuring a bundle length of discontinuous reinforcing fiber bundle and acute angles θ1 and θ2 as tip angles while (B) shows a position for measuring a width of discontinuous reinforcing fiber bundle.

FIGS. 2(A)-2(C) show examples of our discontinuous reinforcing fiber bundle.

FIG. 3 shows an example of device for cutting and scattering a discontinuous reinforcing fiber.

FIGS. 4(A) and 4(B) show an example of separation means being put in a fiber strand running for preparing a partially separated fiber bundle, where (a) is a schematic plan view while (b) is a schematic side view.

EXPLANATION OF SYMBOLS

1: Two-dimensional projection view of discontinuous reinforcing fiber bundle
21: Example of discontinuous reinforcing fiber bundle
22: Example of discontinuous reinforcing fiber bundle
23: Example of discontinuous reinforcing fiber bundle
31: Conveying roll
32: Cutter
33: Distributor
34: Conveyer
35: Carbon fiber strand
36: Discontinuous reinforcing fiber bundle
100: Fiber strand
110: Separated section
120: Accumulated intertwined portion
130: Unseparated section
140: Drifted fluff
150: Fiber separation processing part
160: Intertwined part
170: Fiber separation distance
200: Fiber separation means
210: Projection
211: Contact part

DETAILED DESCRIPTION

Our discontinuous fiber-reinforced composite material comprises a discontinuous reinforcing fiber aggregate of a discontinuous reinforcing fiber having a number average fiber length of 3 to 100 mm and a matrix resin, the discontinuous reinforcing fiber aggregate including a plurality of discontinuous reinforcing fiber bundles having a predetermined number of unidirectionally-bundled single yarns of the discontinuous reinforcing fiber, wherein the discontinuous reinforcing fiber bundle is cut at a predetermined angle with respect to an orientation direction of the single yarn of the discontinuous reinforcing fiber bundle and has different fiber bundle lengths defined as a longest distance between both ends along the orientation direction of the single yarn of the discontinuous reinforcing fiber bundle, characterized in that the shorter the fiber bundle length of the discontinuous reinforcing fiber bundle is, the smaller a tip angle defined as an acute angle at an end of a two-dimensional plane projection of the discontinuous reinforcing fiber bundle is.

Although such our discontinuous fiber-reinforced composite material may have a decreased fluidity when reinforcing fibers is put in matrix resin during molding, the decrease of fluidity can be suppressed by increasing the content of fiber bundle formation consisting of single yarns in the discontinuous reinforcing fiber to achieve a good fluidity. However, a reed shape of the two-dimensional plane projection of the discontinuous reinforcing fiber bundle tends to have structural defects and poor mechanical characteristics as an origin of the fracture around fiber bundle end parts or overlapping portion where fiber bundles overlap in the fiber-reinforced composite material. The longer a fiber length of the discontinuous reinforcing fiber becomes, the superior the mechanical characteristics becomes, although fluidity might be poor because of increased interlace between fibers. On the contrary, the shorter a fiber length of the discontinuous reinforcing fiber becomes, the superior the fluidity in the fiber-reinforced composite material becomes, although mechanical characteristics might be poor. Namely, the structure of discontinuous fiber-reinforced composite material can be controlled by a good balance between fluidity and mechanical characteristics from a general viewpoint that controlling the fluidity doesn't always correspond to desired mechanical characteristics.

To develop a fluidity and mechanical characteristics, it is preferable that a single yarn constituting the discontinuous reinforcing fiber bundle included in the discontinuous fiber-reinforced composite material is made of a discontinuous reinforcing fiber having a number average fiber length of 3 to 100 mm. It is preferably 3 mm or more and less than 50 mm, and is more preferably 3 mm or more and less than 25 mm. The number average fiber length of less than 3 mm might lead to a deterioration of strength of the fiber-reinforced composite material while the number average fiber length of more than 100 mm might increase the number of contact points between reinforcing fibers to deteriorate the fluidity.

To develop an excellent fluidity, it is preferable that the discontinuous reinforcing fiber aggregate includes a plurality of discontinuous reinforcing fiber bundles, which preferably consists of a plurality of single yarns of discontinuous reinforcing fiber. The fiber bundle formation of the discontinuous reinforcing fiber aggregate can suppress the increase of interlace points between fibers.

It is preferable that the discontinuous reinforcing fiber bundle is cut at a predetermined angle with respect to an orientation direction of the single yarn. It is also preferable that the discontinuous reinforcing fiber bundles included in the discontinuous reinforcing fiber aggregate have a discontinuous fiber bundle length different to each other. Each different bundle length of the discontinuous reinforcing fiber bundle included in the discontinuous reinforcing fiber aggregate makes it easy that the discontinuous reinforcing fiber bundles are filled thickly to suppress structural defect generation.

It is preferable that the shorter the fiber bundle length of the discontinuous reinforcing fiber bundle is, the smaller a tip angle defined as an acute angle at an end of a two-dimensional plane projection of the discontinuous reinforcing fiber bundle is. The relation between the shorter fiber bundle length of the discontinuous reinforcing fiber bundle and the smaller tip angle can secure a certain bundle length to develop high mechanical characteristics while the single yarns constituting the discontinuous fiber bundle having length shorter than the bundle length can make the fluidity excellent.

Further, it is preferable that a number average acute angle (A) and a number average acute angle (B) satisfy formulae (1) and (2), wherein the number average acute angle (A) is defined as a number average of the tip angle of each discontinuous reinforcing fiber bundle included in the reinforcing fiber bundle (1) comprising a discontinuous reinforcing fiber bundle having a discontinuous fiber bundle length of more than a number average discontinuous fiber bundle length (L) of a number fiber bundle length of the discontinuous reinforcing fiber bundle included in the discontinuous fiber bundle aggregation and wherein the number average acute angle (B) is defined as a number average of the tip angle of each discontinuous reinforcing fiber bundle included in the reinforcing fiber bundle (2) comprising a discontinuous reinforcing fiber bundle having a discontinuous fiber bundle length of a number average discontinuous fiber bundle length (L) or less.

Number average acute angle $(A) \geq$ Number average acute angle $(B) \times 1.3$      Formula (1):

Number average acute angle $(B) < 60°$      Formula (2):

Although single yarns constituting the bundle have short fiber lengths, the small tip angle of reinforcing fiber bundle (2) of less than the number average discontinuous fiber bundle length (L) can secure a certain bundle length to develop high mechanical characteristics while the large tip angle of reinforcing fiber bundle (1) of the number average discontinuous fiber bundle length (L) or more makes it easy to fill the discontinuous fiber bundles thickly so that fluidity and mechanical characteristics are achieved at the same time. It is more preferable to satisfy the formula of "the number average acute angle (A)$\geq$the number average acute angle (B)$\times$1.5." It is further preferable to satisfy the formula of "the number average acute angle (A)$\geq$number average acute angle (B)$\times$1.7." The number average acute angles (B) of more than 60° C. might have a difficulty of filling the discontinuous fiber bundles thickly as well as deterioration of strength in the fiber-reinforced composite material.

It is preferable that the discontinuous fiber bundle has a number average fiber bundle length (L) of 3 mm or more and less than 100 mm and a fiber bundle width of 0.2 mm or more. The fiber bundle length of less than 3 mm might have a deterioration of strength of the fiber-reinforced composite material. The fiber bundle length of more than 100 mm might have a difficulty of filling the discontinuous fiber bundles thickly to deteriorate strength and fluidity by increasing the interlace points between the discontinuous fiber bundles.

To surely achieve both high fluidity and mechanical characteristics, it is preferable that the reinforcing fiber bundle (2) has a number average acute angle (B) of 5° to 45°. The cutting angle of less than 5° might cause a poor cutting workability.

The discontinuous reinforcing fiber aggregate may include discontinuous reinforcing fibers opened even at a single yarn level which has been generated when the discontinuous reinforcing fiber sheet is prepared.

To secure a high fluidity and mechanical characteristics, it is preferable that the reinforcing fiber bundle (2) has a number average fiber bundle length ($L_2$) of 3 mm or more and less than 50 mm. The number average fiber bundle length ($L_2$) of less than 3 mm might have a short bundle length of reinforcing fiber bundle (2) and deterioration of strength in the fiber-reinforced composite material. The number average fiber bundle length ($L_2$) of more than 50 mm might have deterioration of fluidity by increasing the interlace points between the discontinuous fiber bundles.

The reinforcing fiber is not limited in particular and may be carbon fiber, glass fiber, aramid fiber, alumina fiber, silicon carbide fiber, boron fiber, metal fiber, natural fiber, mineral fiber or mixture thereof.

To achieve high mechanical characteristics, it is preferable that the reinforcing fiber is a carbon fiber. The carbon fiber is not limited in particular and may be a carbon fiber having high strength and high elastic modulus, or mixture thereof. The carbon fiber may be based on polyacrylonitrile (PAN), pitch, rayon or the like. From a viewpoint of balance between the strength and elastic modulus in the shaped product, it is preferable to employ a polyacrylonitrile (PAN)-based carbon fiber. It is preferable that the carbon fiber has a density of 1.65 to 1.95 g/cm$^3$, preferably 1.7 to 1.85 g/cm$^3$. The carbon fiber having too much density might have a poor lightweight performance while the carbon fiber having too little density might have low mechanical characteristics in the carbon fiber composite material.

From a viewpoint of productivity, it is preferable that the carbon fiber forms a carbon fiber strand made by converging single yarns, and it is also preferable that the carbon fiber includes many single yarns in the carbon fiber strand. It is possible that the carbon fiber strand includes 1,000 to 100,000 pieces of single yarns. It is preferable that the carbon fiber strand includes 10,000 to 70,000 pieces of single yarns. The carbon fiber strand may be separated with a strand separation slitter or the like into a separated carbon fiber strand having a desirable strand number and the separated carbon fiber strand may be cut into a predetermined length as needed. Such a separated strand having a desirable strand number is preferable because of its excellent mechanical characteristics and improved uniformity in the carbon fiber composite material in comparison with an untreated strand.

It is particularly preferable to employ a partially separated fiber bundle capable of being slit continuously and stably.

The partially separated fiber bundle means a fiber bundle having alternate formations of a separated section including separated bundles and an unseparated section along a longitudinal direction of fiber strand consisting of single yarns. The partially separated fiber bundle may include an intertwined portion in which the single yarn is intertwined at a terminal of the separated section. It may also include an accumulated intertwined portion.

FIGS. 4(A) and 4(B) will be referred to by the following explanation. FIGS. 4(A) and 4(B) show an example of separation means being put in a fiber strand running to prepare a partially separated fiber bundle, where (a) is a schematic plan view while (b) is a schematic side view. In the figure, fiber strand running direction A (arrow) indicates a longitudinal direction of fiber strand 100, showing that fiber strand 100 is fed from a fiber strand feeder equipment continuously which is not illustrated.

Fiber separation means 200 provided with projection 210 having a projecting shape to make it easy to put in fiber strand 100 is put in the running fiber strand 100 to provide fiber separation processing part 150 approximately in parallel with the longitudinal direction of fiber strand 100. It is preferable that fiber separation means 200 is put in the side of fiber strand 100. The side of the fiber strand means a horizontal face (corresponding to the side face of fiber strand 100 shown in FIGS. 4(A) and 4(B), for example), supposing that the cross section of fiber strand has a flattened shape such as flattened ellipse and landscape-oriented rectangle. Each fiber separation means 200 may be provided with one or more number of projections 210. When fiber separation means 200 is provided with a plurality of projections 210, exchange frequency of projection 210 can be reduced because of reduced abrasion frequency. It is possible that a plurality of fiber separation means 200 are used at the same time according to the number of fiber strand to be separated. Projections 210 can be laid out by arbitrarily arranging fiber separation means 200 with a configuration of parallel, alternate, phase-shift or the like.

When fiber strand 100 consisting of single yarns are separated by fiber separation means 200 into less intertwined separated fiber bundle, fiber strand 100 substantially including many single yarns interlaced without being oriented may form intertwined part 160 where the single yarns are interlaced around contact part 211 during fiber separation process.

The intertwined part 160 may be formed by transferring to contact part 211 an interlaced part between single yarns preliminarily existing in the separated section, or by preparing an aggregate in which single yarns are interlaced by fiber separation means 200.

After having generated fiber separation processing part 150 in arbitrary range, fiber separation means 200 is taken off fiber strand 100. Separated section 110 which has been subject to fiber separation process is generated by taking it off while accumulated intertwined portion 120 which accumulates intertwined part 160 is generated. Further, fluff which has been fallen off the fiber bundles during a fiber separation process generates drifted fluff 140 nearby accumulated intertwined portion 120 during the fiber separation process.

After that, fiber separation means 200 is put in fiber strand 100 again to generate unseparated section 130.

The partially separated fiber bundle can be used like the separated carbon fiber strand so that the carbon fiber composite material is excellent in continuous productivity as well as mechanical characteristics while improving uniformity in comparison with untreated strand.

It is preferable that the carbon fiber strand is subject to a surface processing for the purpose of improving adhesion to matrix resin. The surface processing may be electrolytic processing, ozonation processing, ultraviolet processing or the like. It is possible to add a sizing agent for the purpose of preventing the carbon fiber strand from fluffing, improving convergence of the carbon fiber strand or improving adhesion to the matrix resin. The sizing agent is not limited in particular, and may be a compound having a functional group such as epoxy group, urethane group, amino group and carboxyl group. One or more kinds of the compound can be added together.

The sizing agent can be contained in a sizing liquid, which is attached to a strand after drying a wet carbon fiber strand having a moisture of 20 to 80% through surface processing and washing process.

The sizing agent can be attached to the strand by any method such as immersing a roller in the sizing agent, contacting a roller wet with the sizing liquid and spraying the sizing liquid. From viewpoints of reduced variability and good productivity, it is preferable that the attaching process, which can be a batch process or continuous process, is a continuous process. It is preferable to control sizing liquid concentration, temperature, yarn tension or the like so that quantity of the sizing agent active ingredient attached to the carbon fiber strand uniformly in a proper range. It is preferable that the carbon fiber strand is vibrated by ultrasonic waves at the time of adding the sizing agent.

The drying temperature and the drying time can be adjusted according to the deposition amount of the compound. From viewpoints of complete removal of solvent used to attach the sizing agent, shortened drying time, prevention of sizing agent from thermal deterioration and prevention of carbon fiber strand from hardening to deteriorate the dispersion of bundles, it is preferable that the drying temperature is 150° C. to 350° C., and is preferably 180° C. to 250° C.

It is preferable that the sizing agent is attached to the carbon fiber strand at a rate of 0.01 mass % to 10 mass %, where the denominator is the mass of carbon fiber strand only. It is preferable that the rate is 0.05 mass % to 5 mass %, preferably 0.1 mass % to 5 mass %. The rate of less than 0.01 mass % might not achieve sufficient improvement in adhesion. The rate of more than 10 mass % might deteriorate physical property of shaped product.

The fiber-reinforced composite material contains a matrix resin comprising a thermoplastic resin or/and a thermosetting resin. The thermoplastic resin is not limited in particular, and can be selected to the extent that mechanical characteristics of shaped product are not deteriorated substantially. The thermoplastic resin may be a polyolefin-based resin such as polyethylene resin and polypropylene resin, a polyamide-based resin such as nylon 6 resin and nylon 6,6 resin, a polyester-based resin such as polyethylene terephthalate resin, polybutylene terephthalate resin, polyphenylene sulfide resin, polyetherketone resin, polyethersulfone resin, aromatic polyamide resin or the like. Above all, it is preferable to employ any one of polyamide resin, polypropylene resin and polyphenylene sulfide resin.

The thermosetting resin is not limited in particular either, and can be selected to the extent that mechanical characteristics of shaped product are not deteriorated substantially. The thermosetting resin may be epoxy resin, unsaturated polyester resin, vinyl ester resin, phenolic resin, epoxy acrylate resin, urethane acrylate resin, phenoxy resin, alkyd resin, urethane resin, maleimide resin, cyanate resin or the like. Above all, it is preferable to employ epoxy resin, unsaturated polyester resin, vinyl ester resin, phenolic resin or mixture thereof. It is preferable that the thermosetting resins constituting the mixture have compatibility or high affinity to each other.

It is preferable that the thermosetting resin has a viscosity of 100 to 100,000 mPa·s at normal temperature (25° C.), although it is not limited in particular.

The matrix resin may be a thermoplastic resin and/or thermosetting resin containing an additive as needed to the extent that the desired effect is achieved. The additive may be a filler such as mica, talc, kaolin, hydrotalcite, sericite, bentonite, xonotlite, sepiolite, smectite, montmorillonite, wollastonite, silica, calcium carbonate, glass bead, glass flake, glass micro balloon, clay, molybdenum disulfide, titanium oxide, zinc oxide, antimony oxidate, calcium polyphosphate, graphite, barium sulfate, magnesium sulfate, zinc borate, calcium borate, aluminium borate whisker, potassium titanate whisker and polymer compound, a conductivity-imparting agent based on metal, metal oxide, carbon black or graphite powder or the like, a halogen-based flame retardant such as brominated resin, an antimony-based flame retardant such as antimony trioxide and antimony pentoxide, a phosphate-based flame retardant such as ammonium polyphosphate, aromatic phosphate and red phosphorus, an organic acid metal salt-based flame retardant such as organic boric acid metal salt, carboxylic acid metal salt and aromatic sulfone imide metal salt, an inorganic flame retardant such as zinc borate, zinc, zinc oxide and zirconium compound, a nitrogen-based flame retardant such as cyanuric acid, isocyanuric acid, melamine, melamine cyanurate, melamine phosphate and nitrogen guanidine, a fluorine-based flame retardant such as PTFE, a silicone-based flame retardant such as polyorganosiloxane, a metal hydroxide-based flame retardant such as aluminium hydroxide and magnesium hydroxide or the like, an auxiliary flame retardant such as cadmium oxide, zinc oxide, cuprous hydroxide, cupric hydroxide, ferrous hydroxide, ferric hydroxide, cobalt oxide, manganese oxide, molybdenum oxide, tin oxide and titanium oxide, pigment, dye, lubricant, mold release agent, compatibilizer, dispersant, a nucleating agent such as mica, talc and kaoline, a plasticizer such as ester phosphate, a thermal stabilizer, an antioxidant, a color protection agent, an ultraviolet absorbing agent, a flowability improving agent, a foaming agent, an antimicrobial agent, a dumpling agent, a deodorant, slidability improving agent, an anti-static agent such as polyether ester amide or the like.

The thermosetting resin as a matrix resin may contain an additive such as the above-described thermoplastic resin and shrinkage diminishing agent, to the extent that the desired effect is achieved.

The discontinuous reinforcing fiber aggregate may be manufactured by any process, to the extent that the desired effect is achieved. As shown in FIG. 3, it is preferable that the manufacturing device is provided with conveying roll 31 to convey the reinforcing fiber strand, cutter 32 to cut the reinforcing fiber strand at a predetermined angle into a predetermined size, distributor 33 to disperse the discontinuous reinforcing fiber bundles while the discontinuous reinforcing fiber bundles are accumulated to make a sheet, and conveyer 34 to accumulate the discontinuous reinforcing fiber bundles to make a sheet.

Conveying roll 31 may have a mechanism for nipping between rolls to convey the strand, although it is not limited in particular. It is preferable that the roll is a metal roll or a rubber roll, although it is not limited in particular.

The reinforcing fiber strand can be cut at a predetermined angle by inclining either the yarn being fed to cutter 32 or the cutter relative to the yarn.

It is preferable that the shorter the discontinuous reinforcing fiber bundle length is, the smaller the acute angle is. It is preferable to cut at the tip angle of less than 60°. It is more preferable that the tip angle is 3° to 45°.

Cutter 32 may be of a guillotine blade type or a rotary cutter type, although it is not limited in particular. As described above, the direction of cutter blade is arbitrary to the direction for conveying the reinforcing fiber strand, and may be inclined like the mechanism for conveying the reinforcing fiber strand.

The reinforcing fiber strand may be cut with a plurality of cutters into different lengths of discontinuous reinforcing fiber bundles. It is preferable that the cutter blade angle or the yarn conveying angle is adjusted to make the cutting angle smaller for the longer bundle length.

It is preferable that the discontinuous reinforcing fiber bundle is cut and dispersed uniformly with distributor 33 or the like, and then is accumulated to make a sheet.

Conveyer 34 for accumulating the discontinuous reinforcing fiber bundles to make a sheet may be a metal wire capable of running freely on X-Y plane and catches fallen bundles, although it is not limited in particular. It is possible that a suction box is provided under the metal wire so that the air that disperses the cut discontinuous reinforcing fibers is sucked to reduce the sheet volume. Further, it is possible that a plurality of cutters 32 are provided along X direction while the metal wire runs along Y direction instead of the above-described metal wire capable of running freely on X-Y plane.

The discontinuous reinforcing fiber aggregate may consist of discontinuous reinforcing fibers only, although it may contain a binding material made of thermoplastic resin and/or thermosetting resin from a viewpoint of form keeping. It is preferable that the binding material made of the thermoplastic resin and/or the thermosetting resin is of the same kind as the matrix resin constituting the fiber-reinforced composite material. It is also preferable that the binding material is a resin compatible or adhesive to the matrix resin.

To impregnate the discontinuous reinforcing fiber aggregate with the matrix resin, it is possible that the discontinuous reinforcing fiber aggregate including the matrix resin as a binding material is prepared. Alternatively, the discontinuous reinforcing fiber aggregate prepared without including a binding material may be impregnated with the matrix resin at any step in manufacturing process of fiber-reinforced composite material. Even the discontinuous reinforcing fiber aggregate including a binding material may be impregnated with the matrix resin at any step in manufacturing process of fiber-reinforced composite material.

In the manufacturing process of fiber-reinforced composite material, the above-described discontinuous reinforcing fiber aggregate can be impregnated with the matrix resin by employing a general method.

A pressing machine provided with heating function can impregnate the aggregate with the matrix resin made of thermoplastic resin. The pressing machine may be an ordinary pressing machine provided with a flat platen moving vertically or so-called double belt pressing machine having a mechanism with a pair of running endless steel belts, although it is not limited in particular to the extent that the pressing machine can realize temperature and pressure required for the matrix resin impregnation. In such an impregnation process, it is possible that sheet-like matrix resin such as film, nonwoven fabric and woven fabric is laminated with the discontinuous reinforcing fiber aggregate and then the pressing machine impregnates the laminate as a whole with melted matrix resin. Alternatively, it is possible that preliminarily integrated sheets of the discontinuous reinforcing fiber aggregate and matrix resin are laminated to be melted for impregnation, or preliminarily integrated sheets of the discontinuous reinforcing fiber aggregate and matrix resin are further laminated with sheet-like matrix resin to be melted for impregnation.

When the matrix resin is made of thermosetting resin, the pressing machine may be either an ordinary pressing machine provided with a flat platen moving vertically, so-called double belt pressing machine having a mechanism with a pair of running endless steel belts, or pressing rolls to sandwich a sheet, although it is not limited in particular to the extent that the pressing machine can realize temperature and pressure required for the matrix resin impregnation. In such an impregnation process, it is possible that the discontinuous carbon fiber sheet is sandwiched by matrix resin sheets attached onto a release film and is pressurized and impregnated with the matrix resin. To surely perform the impregnation, it is possible that the air is sucked to depressurize the inside of sheet to a vacuum and then is pressurized.

It is possible that the discontinuous reinforcing fiber aggregate constitutes a sandwich structure with a continuous reinforcing fiber aggregate or another discontinuous reinforcing fiber aggregate to make a fiber-reinforced composite material, to the extent that the desired effect is not disturbed. The sandwich structure may be provided with the discontinuous reinforcing fiber aggregate as a surface layer or a core layer. It is preferable that the surface layer comprises the continuous reinforcing fiber aggregate while the core layer comprises the discontinuous reinforcing fiber aggregate so that the fiber-reinforced composite material has excellent mechanical characteristics and surface quality. The reinforcing fiber, which constitutes the continuous reinforcing fiber aggregate or the another discontinuous reinforcing fiber aggregate, is not limited in particular, and may be made of carbon fiber, glass fiber, aramid fiber, alumina fiber, silicon carbide fiber, boron fiber, metal fiber, natural fiber, mineral fiber or the like. One or more kinds of these fibers may be used together. The reinforcing fiber of continuous reinforcing fiber aggregate may be formed generally, to the extent that the desired effect is not disturbed. It may be formed as a unidirectional reinforcing fiber aggregate in which reinforcing fibers are oriented unidirectionally, a reinforcing fiber laminate aggregate in which the unidirectional reinforcing fibers are laminated multidirectionally, a woven reinforcing fiber aggregate made of woven reinforcing fibers or the like. The reinforcing fiber of the another discontinuous reinforcing fiber aggregate may be formed generally, to the extent that the desired effect is not disturbed. It may be formed as a chopped strand sheet in which strands cut into a predetermined length are dispersed, a dry discontinuous reinforcing fiber sheet prepared by a carding machine or an air-laid machine, a wet discontinuous reinforcing fiber sheet prepared by a paper machine or the like.

Thus obtained fiber-reinforced composite material can be used as SMC (Sheet Molding Compound) when the matrix resin is made of thermosetting resin, while it can be used as a stampable sheet when the matrix resin is made of thermoplastic resin.

The SMC shaped product can be provided by heating and pressurizing a semi-hardened sheet-like base material (SMC) by using a heating type pressing machine, wherein the sheet-like base material is made by impregnating the discontinuous reinforcing fiber aggregate with thermosetting matrix resin. The stampable sheet shaped product may be prepared by cooling and pressuring a base material (stampable sheet) in a mold at a predetermined temperature after heating the sheet-like base material by using an infrared heater or the like above the melting point of the thermoplastic resin, wherein the sheet-like base material is made by impregnating the discontinuous reinforcing fiber aggregate with thermoplastic resin.

Thus obtained shaped product can be suitably applied to automotive components, airplane parts, home electric appliances, office work electric appliances, housings for PCs or the like.

Examples

Examples and Comparative Examples will be explained.
At first, characteristics and its measurement methods employed in the Examples and Comparative Examples will be explained.
(1) Measurement of Bundle Width (we) of Discontinuous Reinforcing Fiber Bundle The fiber-reinforced composite material cut into a sample of 100 mm×100 mm is heated for 2 to 3 hours in an electric furnace at 550° C. to burn out organic substances such as matrix resin. The discontinuous reinforcing fiber aggregate is extracted from the burn-out sample and then the discontinuous reinforcing fiber is carefully picked out from the discontinuous reinforcing fiber aggregate by using tweezers as not collapsing the whole shape of bundle. All the discontinuous reinforcing fiber bundles extracted and placed on a flat stand is subject to measurements with a vernier caliper of which measurement accuracy is 0.1 mm to measure the reinforcing fiber bundle widths at both ends (($w_1$) and ($w_3$) shown in FIGS. 1(A) and 1(B) and 2(A)-2(C) and at the center (($w_2$) shown in FIGS. 1(A) and 1(B) and 2(A)-2(C) of the discontinuous reinforcing fiber bundle orthogonal to the fiber orientation direction when the discontinuous reinforcing fiber bundle is projected onto a two-dimensional plane.

Both ends (($w_1$) and ($w_3$) shown in FIGS. 1(A) and 1(B) and 2(A)-2(C) of the discontinuous reinforcing fiber bundle mean both ends of a section in which the number of fibers is constant in the width directional fiber bundle cross section orthogonal to the fiber orientation direction when the discontinuous reinforcing fiber bundle is projected onto the two-dimensional plane.

To measure the widths more accurately, it is possible to measure the reinforcing fiber bundle widths at both ends and the center of the discontinuous reinforcing fiber bundle projected onto the two-dimensional plane, by using a digital microscope (made by KEYENCE Corporation). The discontinuous reinforcing fiber bundle widths measured at both ends ($w_1$) and ($w_3$) and center ($w_2$) are recorded on a recording paper, and discontinuous reinforcing fiber bundle width ($W_n$) is defined as average of bundle widths ($w_1$) to ($w_3$). The discontinuous reinforcing fiber bundles having discontinuous reinforcing fiber bundle width ($W_n$) of less than 0.2 mm are not counted as a discontinuous reinforcing fiber but as an opened discontinuous reinforcing fiber bundle. To define the bundle width direction, the width corresponds to the long side of fiber directional cross section at the center of discontinuous reinforcing fiber bundle while the thickness corresponds to the short side thereof. When the discontinuous reinforcing fiber aggregate cannot be extracted easily from the fiber-reinforced composite material, it is possible that discontinuous reinforcing fiber aggregate which is not impregnated with matrix resin is subject to measurement.
(2) Measurement of Discontinuous Reinforcing Fiber Bundle Length ($L_n$) and Discontinuous Reinforcing Fiber Bundle Acute Angle ($\theta_n$)

All the discontinuous reinforcing fiber bundles having discontinuous reinforcing fiber bundle width ($W_n$) of 0.2 mm or more is subject to measurement of discontinuous reinforcing fiber bundle length (($L_n$) shown in FIGS. 1(A)

and 1(B) and 2(A)-2(C) and lengths (($l_1$) and ($l_2$)) shown in FIGS. 1(A) and 1(B) and 2(A)-2(C).

Tip angle ($\theta_n$) as acute angle of thus obtained discontinuous reinforcing fiber bundle is calculated by formulae (3), (4) and (5) from discontinuous reinforcing fiber bundle length ($L_n$) and lengths ($l_1$) and ($l_2$), when the bundle shape of the discontinuous reinforcing fiber is a shape of I-type shown in FIGS. 1(A) and 1(B).

$$\text{Tip angle } \theta_1 = \tan^{-1}\{W_n/(L_n-l_1)\} \quad \text{Formula (3):}$$

$$\text{Tip angle } \theta_2 = \tan^{-1}\{W_n/(L_n-l_2)\} \quad \text{Formula (4):}$$

$$\text{Tip angle } (\theta_n) = (\text{acute angle } \theta_1 + \text{acute angle } \theta_2)/2 \quad \text{Formula (5):}$$

When the bundle shape of the discontinuous reinforcing fiber is a shape of A-type shown in FIG. 2 (A), acute angle $\theta_1$ and acute angle $\theta_2$ are approximated by formulae (6) and (7) while tip angle ($\theta_n$) of the reinforcing fiber bundle is calculated by formula (5).

$$\text{Tip angle } \theta_1 = 2\tan^{-1}\{(\tfrac{1}{2})W_n/(l_1)\} \quad \text{Formula (6):}$$

$$\text{Tip angle } \theta_2 = 2\tan^{-1}\{(\tfrac{1}{2})W_n/(l_2)\} \quad \text{Formula (7):}$$

When the bundle shape of the discontinuous reinforcing fiber is a shape of V-type shown in FIG. 2 (B), W-type shown in FIG. 2 (C) or the like, in which on side end is provided with a plurality of tip angles, tip angle $\theta_1$ and tip angle $\theta_2$ are approximated by formulae (8) and (9) while tip angle ($\theta_n$) of the reinforcing fiber bundle is calculated by formula (5).

$$\text{Tip angle } \theta_1 = \tan^{-1}\{(1/m_1)W_n/(l_1)\} \quad \text{Formula (8):}$$

$$\text{Tip angle } \theta_2 = \tan^{-1}\{(1/m_2)W_n/(l_2)\} \quad \text{Formula (9):}$$

$m_1$ indicates the number of tip angles at the side end for the measurement of $l_1$ while $m_2$ indicates the number of tip angles at the side end for the measurement of $l_2$. The above-described calculation provides $m_1=2$ and $m_2=2$ in the V-type shape shown in FIG. 2 (B) while it provides $m_1=3$ and $m_2=3$ in the W-type shape shown in FIG. 2 (C).

(3) Classification of Reinforcing Fiber Bundle (1) and Reinforcing Fiber Bundle (2)

Number average discontinuous fiber bundle length (L) is calculated from the obtained discontinuous reinforcing fiber bundle lengths ($L_n$) by formula (10). All the discontinuous reinforcing fiber bundles having discontinuous reinforcing fiber bundle width ($W_n$) of 2 mm or more are classified into discontinuous reinforcing fiber bundle (1) and discontinuous reinforcing fiber bundle (2), where the bundle (1) has discontinuous having discontinuous fiber bundle length ($L_n$) of more than number average discontinuous fiber bundle length (L) while the bundle (2) has discontinuous having discontinuous fiber bundle length ($L_n$) of equal to or less than number average discontinuous fiber bundle length (L).

After the classification, number average discontinuous fiber bundle length ($L_2$) is calculated by formula (11).

$$L = \Sigma(L_n)/n \quad \text{Formula (10):}$$

The number of reinforcing fiber bundles subject to measurement is indicated as n.

$$L_2 = \Sigma(L_{n2})/n_2 \quad \text{Formula (11):}$$

The number of reinforcing fiber bundles (2) subject to measurement is indicated as $n_2$.

(4) Calculation of Number Average Acute Angle (A) and Number Average Acute Angle (B)

Number average acute angle (A) of discontinuous reinforcing fiber bundle (1) is calculated by formula (12) while number average acute angle (B) of discontinuous reinforcing fiber bundle (2) is calculated by formula (13).

$$\text{Number average acute angle } (A) = \Sigma(\text{tip angle } (\theta_{n1}))/n_1 \quad \text{Formula (12):}$$

Tip angle ($\theta_{n1}$) is a tip angle of discontinuous reinforcing fiber bundle (1) while $n_1$ is the number of discontinuous reinforcing fiber bundles (1).

$$\text{Number average acute angle } (B) = \Sigma(\text{tip angle } (\theta_{n2}))/n_2 \quad \text{Formula (13):}$$

Tip angle ($\theta_{n2}$) is a tip angle of discontinuous reinforcing fiber bundle (2) while $n_2$ is the number of discontinuous reinforcing fiber bundles (2).

(5) Vf (Reinforcing Fiber Content in Stampable Sheet)

A sample of approximately 2 g is cut out from the fiber-reinforced composite material and its mass is measured. The sample is heated for 2 hours in an electric furnace at 500 to 600° C. to burn out organic substances such as matrix resin. The residual weight of discontinuous reinforcing fiber is measured after cooling off to room temperature. The ratio of sample weight before burning out the organic substances such as matrix resin relative to the weight of discontinuous reinforcing fiber is measured, and then volume content Vf is calculated from the specific gravity and the weight content of the reinforcing fiber.

(6) Bending Strength and Bending Elastic Modulus

The bending strength is measured according to JIS-K7171 (2008). Further, CV value (Coefficient of Variation [%]) of bending strength is calculated. The bending strength is determined as good (○) or no good (x), where the "good" determination corresponds to smaller CV value of less than 7% while the "no good" determination corresponds to larger CV value of 7% or more.

The sample of bending test is subject to measurement in an arbitrary direction (0° direction) and the second direction (90° direction) to determine the isotropy, where "isotropic (○)" determination corresponds to the ratio of (average value in 0° direction/average value in 90° direction) within the range of 1.3 to 0.77 while "anisotropic (x)" determination corresponds to the outside the range.

(7) Evaluation of Fluidity

Thermoplastic Matrix Resin

A sheet of discontinuous fiber-reinforced composite material of which dimension is 100 mm×100 mm×2 mm thickness is placed on a pressing plate heated to a temperature of the melting point of thermoplastic resin+40° C. and the surface of 100 mm×100 mm is pressurized at 10 MPa for 300 seconds. The pressing plate is cooled down to a temperature of the solidification temperature—50° C. as pressurizing and then the sample is taken out. Area A1 of the sheet before the pressurization and area A2 of the sheet after the pressurization are measured to calculate fluidity [%/mm] defined as A2/A½ mm thickness.

Thermosetting Matrix Resin

A sheet of precursor of discontinuous fiber-reinforced composite material with uncured matrix resin of which dimension is 100 mm×100 mm×2 mm thickness is placed on a pressing plate heated to a temperature to finish the curing within 300 to 400 seconds of curing time of matrix resin from flow start to curing, and the surface of 100 mm×100 mm is pressurized at 10 MPa for 600 seconds. Area A1 of the sheet before the pressurization and area A2 of the sheet after the pressurization are measured to calculate fluidity [%/mm] defined as A2/A½ mm thickness.

(8) Measurement of Number Average Fiber Length

The fiber-reinforced composite material cut into a sample of 100 mm×100 mm is heated for 2 to 3 hours in an electric furnace at 550° C. to burn out organic substances such as matrix resin. Single yarns of 400 pieces of discontinuous reinforcing fiber are arbitrarily extracted by using tweezers from the discontinuous reinforcing fiber aggregate left after cooling to room temperature. The extracted single yarns are observed with an optical microscope or a scanning electron microscope to measure the length by measurement accuracy of 0.1 mm so that the number average fiber length of the reinforcing fibers is calculated by the formula of "number average fiber length=$\Sigma$ $L_i$/400. The $L_i$ indicates fiber length measured.

Reinforcing fibers and matrix resins employed in Examples and Comparative Examples will be explained.

Reinforcing Fiber Strand (1):

The continuous carbon fiber strand has fiber diameter of 7 μm, tensile elastic modulus of 230 GPa and filament number of 12,000.

Reinforcing Fiber Strand (2):

The continuous carbon fiber strand has fiber diameter of 7.2 μm, tensile elastic modulus of 242 GPa and filament number of 50,000.

Matrix Resin (1):

Nylon resin (made by Toray Industries, Inc., CM1001, product name "AMILAN" (registered trademark)) is employed.

Matrix Resin (2):

Vinylester resin (VE) resin (made by The Dow Chemical Company, "DERAKANE" 790 (registered trademark)) of 100 parts by mass, tert-butyl peroxyl benzoate (made by NOF CORPORATION, "PERBUTYL Z" (registered trademark)) of 1 part by mass, zinc stearate (made by Sakai Chemical Industry Co., Ltd., SZ-2000) of 2 parts by mass, and magnesium oxide (made by Kyowa Chemical Industry Co., Ltd., MgO#40) of 4 parts by mass are blended.

Example 1

The discontinuous reinforcing fiber aggregate was prepared by using a device shown in FIG. 3. Reinforcing fiber strand (1) was cut by two units of cutters disposed in parallel. First cutter (1) cut it into a piece having tip angle of 90° and fiber length of 20 mm while second cutter (2) cut it into a piece having tip angle of 45° and fiber length of 10 mm. Cutter (1) and cutter (2) discharged chopped reinforcing fibers of the same weight to deposit discontinuous reinforcing fiber aggregates on a conveyer. Thus obtained discontinuous reinforcing fiber aggregate was formed in a discontinuous reinforcing fiber sheet uniformly including a discontinuous reinforcing fiber bundle having tip angle of 90° and fiber length of 20 mm as well as another discontinuous reinforcing fiber bundle having tip angle of 45° and fiber length of 10 mm, wherein number average bundle length was 18 mm, number average acute angle (A) was 90°, number average acute angle (B) was 45° and the ratio of number average acute angle (A)/number average acute angle (B) was 2.0.

Thus obtained discontinuous carbon fiber sheet and a matrix resin film produced by a film making machine were laminated and preheated for 300 seconds in a plate mold of pressing machine heated to 280° C., which was pressurized at pressure of 10 MPa for 600 seconds and was cooled to 50° C. while cooling so that a plate of carbon fiber composite material having thickness of 2 mm and Vf of 35% was produced.

Thus obtained plate had no warpage and had 395 MPa of average bending strength of carbon fiber composite material in directions of 0° and 90°, CV value of bending strength in each direction of less than 7%, and fluidity of 250%/mm, while being determined as two-dimensionally "isotropic" according to the ratio of (average value in 0° direction/average value in 90° direction) within the range of 1.3 to 0.77. Table 1 shows conditions and results of the evaluation.

Example 2

The plate of fiber-reinforced composite material was produced and evaluated in the same method as Example 1, except that first cutter (1) cut reinforcing fiber strand (1) into a piece having tip angle of 65° and fiber length of 20 mm while second cutter (2) cut it into a piece having tip angle of 45° and fiber length of 10 mm, and then cutter (1) and cutter (2) discharged chopped reinforcing fibers of the same weight to deposit discontinuous reinforcing fiber aggregates on a conveyer. Table 1 shows results of the evaluation.

Example 3

The plate of fiber-reinforced composite material was produced and evaluated in the same method as Example 1, except that first cutter (1) cut reinforcing fiber strand (1) into a piece having tip angle of 65° and fiber length of 20 mm while second cutter (2) cut it into a piece having tip angle of 30° and fiber length of 5 mm, and then cutter (1) and cutter (2) discharged chopped reinforcing fibers of the same weight to deposit discontinuous reinforcing fiber aggregates on a conveyer. Table 1 shows results of the evaluation.

Example 4

The same discontinuous reinforcing fiber aggregate and matrix resin (2) as Example 2 were employed. The resin content was adjusted to achieve Vf=35% and the resin applied to the release film to sandwich the discontinuous reinforcing fiber aggregate to be impregnated during pressurizing, and then uncured SMC sheet was produced. After the obtained uncured SMC sheet was thickened for 12 hours in a furnace heated to 40° C., the uncured SMC was fed into a plate mold of pressing machine heated to 140° C. as adjusting the feeding amount, which was pressurized at pressure of 10 MPa for 300 seconds so that a plate of carbon fiber composite material having thickness of 2 mm was produced.

Thus obtained plate had no warpage and had 430 MPa of average bending strength of carbon fiber composite material in directions of 0° and 90°, CV value of bending strength in each direction of less than 7%, and fluidity of 270%/mm, while being determined as two-dimensionally "isotropic" according to the ratio of (average value in 0° direction/average value in 90° direction) within the range of 1.3 to 0.77. Table 1 shows results of the evaluation.

Example 5

The plate of fiber-reinforced composite material was produced and evaluated in the same method as Example 4, except that the same discontinuous reinforcing fiber aggregates as Example 3 was employed. Table 1 shows results of the evaluation.

Example 6

The plate of fiber-reinforced composite material was produced and evaluated in the same method as Example 2, except that first cutter (1) cut reinforcing fiber strand (1) into a piece having tip angle of 65° and fiber length of 20 mm while second cutter (2) cut it into a piece having tip angle of 45° and fiber length of 10 mm, and then cutter (1) and cutter (2) discharged chopped reinforcing fibers by the weight ratio of 2:1 to deposit discontinuous reinforcing fiber aggregates on a conveyer. Table 1 shows results of the evaluation.

Example 7

The plate of fiber-reinforced composite material was produced and evaluated in the same method as Example 1, except that first cutter (1) cut reinforcing fiber strand (2) into a piece having tip angle of 65° and fiber length of 20 mm while second cutter (2) cut it into a piece having tip angle of 45° and fiber length of 5 mm, and then cutter (1) and cutter (2) discharged chopped reinforcing fibers of the same weight to deposit discontinuous reinforcing fiber aggregates on a conveyer. Table 1 shows results of the evaluation.

Example 8

The plate of fiber-reinforced composite material was produced and evaluated in the same method as Example 4, except that the same discontinuous reinforcing fiber aggregates as Example 7 was employed. Table 1 shows results of the evaluation.

Example 9

The plate of fiber-reinforced composite material was produced and evaluated in the same method as Example 4, except that first cutter (1) cut reinforcing fiber strand (1) into a piece having tip angle of 30° and fiber length of 35 mm while second cutter (2) cut it into a piece having tip angle of 15° and fiber length of 12 mm, and then cutter (1) and cutter (2) discharged chopped reinforcing fibers by the weight ratio of 1:6 to deposit discontinuous reinforcing fiber aggregates on a conveyer. Table 1 shows results of the evaluation.

Comparative Example 1

The plate of fiber-reinforced composite material was produced and evaluated in the same method as Example 1, except that first cutter (1) cut reinforcing fiber strand (1) into a piece having tip angle of 90° and fiber length of 20 mm while second cutter (2) cut it into a piece having tip angle of 90° and fiber length of 10 mm, and then cutter (1) and cutter (2) discharged chopped reinforcing fibers of the same weight to deposit discontinuous reinforcing fiber aggregates on a conveyer.

Table 2 shows results of the evaluation. Thus obtained fiber-reinforced composite material had poor bending strength and poor bending elastic modulus as well as much variation of the CV value.

Comparative Example 2

The plate of fiber-reinforced composite material was produced and evaluated in the same method as Example 1, except that first cutter (1) cut reinforcing fiber strand (1) into a piece having tip angle of 90° and fiber length of 30 mm while second cutter (2) cut it into a piece having tip angle of 90° and fiber length of 10 mm, and then cutter (1) and cutter (2) discharged chopped reinforcing fibers of the same weight to deposit discontinuous reinforcing fiber aggregates on a conveyer.

Table 2 shows results of the evaluation. Thus obtained fiber-reinforced composite material had poor bending elastic modulus and poor fluidity as well as much variation of the CV value.

Comparative Example 3

The plate of fiber-reinforced composite material was produced and evaluated in the same method as Example 1, except that first cutter (1) cut reinforcing fiber strand (1) into a piece having tip angle of 90° and fiber length of 20 mm while second cutter (2) cut it into a piece having tip angle of 65° and fiber length of 10 mm, and then cutter (1) and cutter (2) discharged chopped reinforcing fibers of the same weight to deposit discontinuous reinforcing fiber aggregates on a conveyer.

Table 2 shows results of the evaluation. Thus obtained fiber-reinforced composite material had poor bending strength and poor bending elastic modulus as well as much variation of the CV value.

TABLE 1

|  | Unit | Example 1 | Example 2 | Example 3 | Example 4 | Example 5 | Example 6 | Example 7 | Example 8 | Example 9 |
|---|---|---|---|---|---|---|---|---|---|---|
| Reinforcing fiber strand | — | (1) | (1) | (1) | (1) | (1) | (1) | (2) | (2) | (1) |
| Cut length (1) | mm | 20 | 20 | 20 | 20 | 20 | 20 | 20 | 20 | 35 |
| Cut length (2) | mm | 10 | 10 | 5 | 10 | 5 | 10 | 5 | 5 | 12 |
| Cut angle (1) |  | 90 | 65 | 65 | 65 | 65 | 65 | 65 | 65 | 30 |
| Cut angle (2) |  | 45 | 45 | 30 | 45 | 30 | 45 | 45 | 45 | 15 |
| Weight ratio (1):(2) | — | 1:1 | 1:1 | 1:1 | 1:1 | 1:1 | 2:1 | 1:1 | 1:1 | 1:6 |
| Number average bundle length L | mm | 18 | 20 | 20 | 20 | 20 | 21 | 23 | 23 | 39 |
| Number average bundle length $L_2$ | mm | 17 | 17 | 17 | 17 | 17 | 17 | 17 | 17 | 38 |

TABLE 1-continued

| | Unit | Example 1 | Example 2 | Example 3 | Example 4 | Example 5 | Example 6 | Example 7 | Example 8 | Example 9 |
|---|---|---|---|---|---|---|---|---|---|---|
| Number average acute angle (A)/(B) | — | 2.0 | 1.4 | 2.2 | 1.4 | 2.2 | 1.4 | 1.4 | 1.4 | 2.2 |
| Number average acute angle (B) | | 45 | 45 | 30 | 45 | 30 | 45 | 45 | 45 | 15 |
| Matrix resin | — | (1) | (1) | (1) | (2) | (2) | (1) | (1) | (2) | (2) |
| Vf | % | 35 | 35 | 35 | 35 | 35 | 35 | 35 | 35 | 35 |
| Bending strength | MPa | 395 | 400 | 430 | 430 | 450 | 405 | 385 | 400 | 460 |
| Bending elastic modulus | GPa | 25 | 25 | 26 | 26 | 26 | 25 | 25 | 26 | 26 |
| CV value | — | ○: Good | ○: Good | ○: Good | ○: Good | ○: Good | ○: Good | ○: Good | ○: Good | ○: Good |
| Isotropy | — | ○: Isotropic | ○: Isotropic | ○: Isotropic | ○: Isotropic | ○: Isotropic | ○: Isotropic | ○: Isotropic | ○: Isotropic | ○: Isotropic |
| Fluidity | %/mm | 250 | 250 | 270 | 270 | 280 | 230 | 265 | 290 | 290 |

TABLE 2

| | Unit | Comparative Example 1 | Comparative Example 2 | Comparative Example 3 |
|---|---|---|---|---|
| Reinforcing fiber strand | — | (1) | (1) | (1) |
| Cut length (1) | mm | 20 | 30 | 20 |
| Cut length (2) | mm | 10 | 15 | 10 |
| Cut angle (1) | | 90 | 90 | 90 |
| Cut angle (2) | | 90 | 90 | 65 |
| Weight ratio (1):(2) | — | 1:1 | 1:1 | 1:1 |
| Number average bundle length L | mm | 13 | 20 | 14 |
| Number average bundle length $L_2$ | mm | — | — | 16 |
| Number average acute angle (A)/(B) | — | 1.0 | 1.0 | 1.4 |
| Number average acute angle (B) | | — | — | 65 |
| Matrix resin | — | (1) | (1) | (1) |
| Vf | % | 35 | 35 | 35 |
| Bending strength | MPa | 355 | 370 | 370 |
| Bending elastic modulus | GPa | 24 | 24 | 24 |
| CV value | — | ×: No good | ×: No good | ×: No good |
| Isotropy | — | ○: Isotropic | ×: Anisotropic | ○: Isotropic |
| Fluidity | %/mm | 250 | 230 | 250 |

Our discontinuous fiber-reinforced composite material is applicable to any shaped product of discontinuous fiber-reinforced composite material requiring high fluidity, two-dimensional isotropy and small variation of mechanical characteristics which have not been achieved conventionally.

The invention claimed is:

1. A discontinuous fiber-reinforced composite material comprising a discontinuous reinforcing fiber aggregate of discontinuous reinforcing fibers having a number average fiber length of 3 to 100 mm and a matrix resin, the discontinuous reinforcing fiber aggregate including a plurality of discontinuous reinforcing fiber bundles having a predetermined number of unidirectionally-bundled single yarns of the discontinuous reinforcing fiber,
wherein each of the discontinuous reinforcing fiber bundles has a cut surface inclined at a predetermined angle with respect to an orientation direction of the single yarns and the discontinuous reinforcing fiber bundles have different fiber bundle lengths,
wherein the shorter a discontinuous fiber bundle length, which is defined as a distance between both ends along the orientation of the single yarns is, the smaller a tip angle defined as an acute angle at an end of a two-dimensional plane projection of the discontinuous reinforcing fiber bundle is, wherein a number average acute angle (A) and a number average acute angle (B) satisfy formulae (1) and (2), wherein the number average acute angle (A) is defined as a number average of the tip angle of each discontinuous reinforcing fiber bundle belonging to classification (1) of discontinuous reinforcing fiber bundles having a discontinuous fiber bundle length of more than a number average discontinuous fiber bundle length (L) of the discontinuous reinforcing fiber bundles included in the discontinuous reinforcing fiber aggregate and wherein the number average acute angle (B) is defined as a number average of the tip angle of each discontinuous reinforcing fiber bundle belonging to classification (2) of discontinuous reinforcing fiber bundles having a discontinuous fiber bundle length of the number average discontinuous fiber bundle length (L) or less:

Number average acute angle (A)>Number average acute angle (B)×1.3;     Formula (1);

Number average acute angle (B)<60°     Formula (2).

2. The discontinuous fiber-reinforced composite material according to claim 1, wherein the number average fiber bundle length (L) is 3 mm or more and less than 100 mm.

3. The discontinuous fiber-reinforced composite material according to claim 1, wherein the reinforcing fiber bundle (2) has a number average acute angle (B) of 5° to 45°.

4. The discontinuous fiber-reinforced composite material according to claim 3, wherein the number average fiber bundle length (L) is 3 mm or more and less than 100 mm.

5. The discontinuous fiber-reinforced composite material according to claim 3, wherein the discontinuous reinforcing fiber bundles belonging to classification (2) have a number average fiber bundle length ($L_2$) of 3 mm or more and less than 30 mm.

6. The discontinuous fiber-reinforced composite material according to claim 5, wherein the number average fiber bundle length (L) is 3 mm or more and less than 100 mm.

7. The discontinuous fiber-reinforced composite material according to claim 1, wherein the discontinuous reinforcing fiber bundles belonging to classification (2) have a number average fiber bundle length ($L_2$) of 3 mm or more and less than 30 mm.

8. The discontinuous fiber-reinforced composite material according to claim 7, wherein the number average fiber bundle length (L) is 3 mm or more and less than 100 mm.

* * * * *